S. Elliott. Carpet Stretcher

117528      Patented Aug 1 1871

Witnesses:
John Becker
Wm. H. K. Smith

Inventor:
S. Elliott
per
Attorneys.

UNITED STATES PATENT OFFICE.

SAMUEL ELLIOTT, OF SONORA, CALIFORNIA.

IMPROVEMENT IN CARPET-STRETCHERS.

Specification forming part of Letters Patent No. 117,528, dated August 1, 1871.

*To all whom it may concern:*

Be it known that I, SAMUEL ELLIOTT, of Sonora, in the county of Tuolumne and State of California, have invented a new and useful Improvement in Carpet-Stretcher; and I do hereby declare that the following is a full, clear, and exact description thereof, which will enable others skilled in the art to make and use the same, reference being had to the accompanying drawing forming part of this specification, in which—

Figure 1:
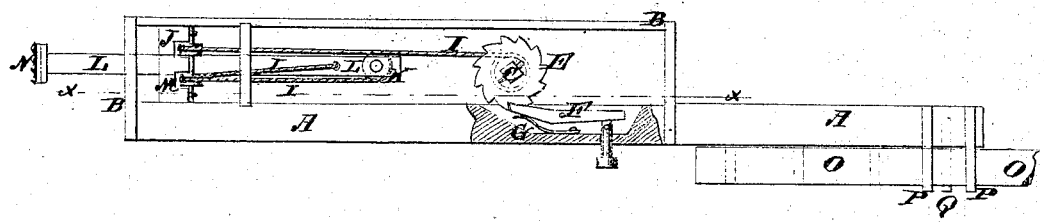
Figure 2:
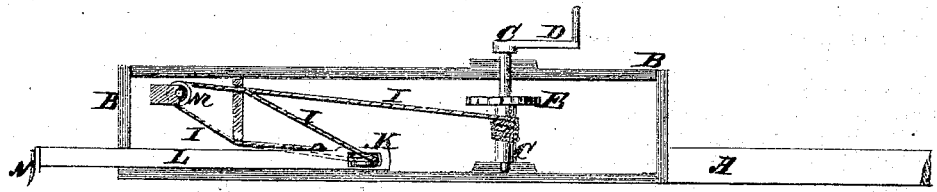

Figure 1 is a top view of my improved stretcher, the top plate of the box being removed and part being broken away to show the construction. Fig. 2 is a detail sectional view of the same taken through the line $x\,x$, Fig. 1.

Similar letters of reference indicate corresponding parts.

My invention has for its object to furnish an improved instrument for stretching carpets and holding them while being tacked down, and which shall be simple in construction, effective in operation, and conveniently operated; and it consists in the stretcher, constructed as hereinafter more fully described.

A is a bar, to which is attached a box, B. C is a shaft, the journals of which revolve in bearings in the box B, and to the projecting upper end of which is attached a crank, D, by means of which the stretcher is extended to stretch the carpet. To the shaft C is attached a ratchet-wheel, E, upon the teeth of which the pawl F takes hold to hold the stretcher extended. The pawl F is pivoted to the side of the box B, is held forward against the ratchet-wheel E by a spring, G, and has a pin, H, attached to it and extending out through the side of the box for convenience in detaching the pawl from the ratchet-wheel E. To the shaft C, or to a drum formed upon or attached to said shaft, is attached one end of a rope, I. The rope I passes over a guide-pulley, J, pivoted to the box B, around a pulley, K, pivoted to the end of the bar L, around a pulley, M, pivoted to the box B, and its other end is attached to the bar L near its inner end. The bar L passes out through the end of the box B and has claws or teeth N attached to its end to take hold of the carpet to be stretched. O is a bar, the end of which overlaps the end of the bar A, with which it is adjustably connected by passing through a keeper or keepers, P, attached to the said bar A, and by a pin, Q, which passes through one or the other of the holes in the bar O and into a hole in the bar A, as shown in Fig. 1.

In using the stretcher the carpet is extended upon the floor and is tacked down for about a foot from the corner. The end of the extension bar O is placed in this corner of the room and adjusted upon the bar A, so that the outer end of the bar L, when extended, will reach to the opposite corner of the room. The claws or teeth N are then caught upon the carpet and the bar L is forced out by turning the crank D until the carpet has been stretched to its place, when the pawl F, catching upon the ratchet-wheel E, holds the carpet to its place until tacked down. The pawl F is then withdrawn with one hand and the bar L pushed partly in with the other hand to adjust the instrument to the proper length as it is moved along the wall of the room.

Having thus described my invention, I claim as new and desire to secure by Letters Patent—

An improved carpet-stretcher, consisting of the bar A, box B, shaft C, crank D, ratchet-wheel E, spring-pawl F G H, rope I, guide-pulleys J K M, sliding toothed bar L N, and extension bar O, said parts being constructed and operating, substantially as herein shown and described and for the purpose set forth.

SAMUEL ELLIOTT.

Witnesses:
D. M. KENFIELD,
I. H. SMITH.